United States Patent [19]

Avi-Itzhak

[11] Patent Number: 5,559,898
[45] Date of Patent: Sep. 24, 1996

[54] COMPARISON INEQUALITY FUNCTION BASED METHOD FOR ACCELERATED OCR CORRELATION

[75] Inventor: Hadar Avi-Itzhak, Mountain View, Calif.

[73] Assignee: Canon Inc., Tokyo, Japan

[21] Appl. No.: 461,924

[22] Filed: Jun. 5, 1995

Related U.S. Application Data

[63] Continuation of Ser. No. 140,310, Oct. 22, 1993, abandoned.

[51] Int. Cl.$^6$ .................................................. G06K 9/68
[52] U.S. Cl. ............................................ 382/218; 382/209
[58] Field of Search ..................................... 382/209, 215, 382/218, 219, 220, 224, 278

[56] References Cited

U.S. PATENT DOCUMENTS

| | | | |
|---|---|---|---|
| 3,152,318 | 10/1964 | Swift, Jr. ............................ | 340/146.3 |
| 4,467,437 | 8/1984 | Tsuruta et al. ...................... | 382/30 |
| 4,672,678 | 6/1987 | Koezuka et al. .................... | 382/30 |
| 4,975,974 | 12/1990 | Nishimijima ....................... | 382/34 |
| 5,067,166 | 11/1991 | Ito ...................................... | 382/30 |
| 5,077,805 | 12/1991 | Tan ..................................... | 382/30 |
| 5,177,793 | 1/1993 | Murai et al. ........................ | 382/30 |
| 5,197,107 | 3/1993 | Katsyama et al. .................. | 382/30 |

*Primary Examiner*—Jose L. Couso
*Attorney, Agent, or Firm*—Paul Hentzel; Edward J. Radlo

[57] ABSTRACT

A general method of accelerating the classification of an unclassified input symbol S into a library of pre-classified templates employs a comparison inequality function. The correlation calculation is initiated between the input symbol S and templates retrieved from the library of templates. Templates with a low degree of correlation are excluded prior to completion of the correlation calculation to accelerate the correlation. Sorting by temple intensity permits the temple foreground pixels to be correlated first, which also accelerates the correlation calculation. A second sort by discrimination power permits critical conflict pixels to be correlated first for further accelerating the correlation calculation.

36 Claims, 5 Drawing Sheets

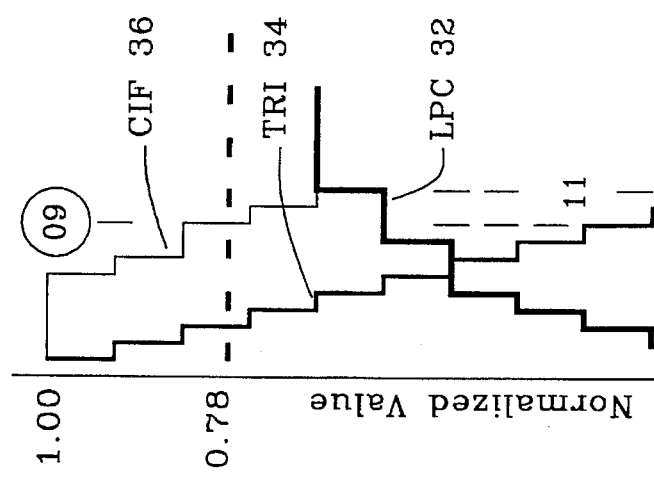
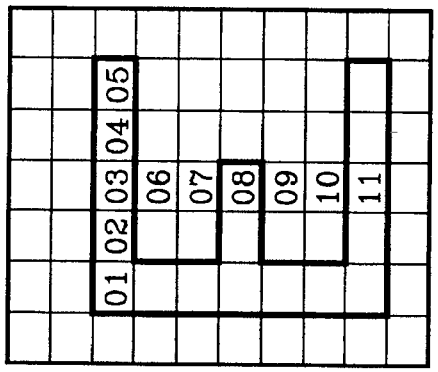
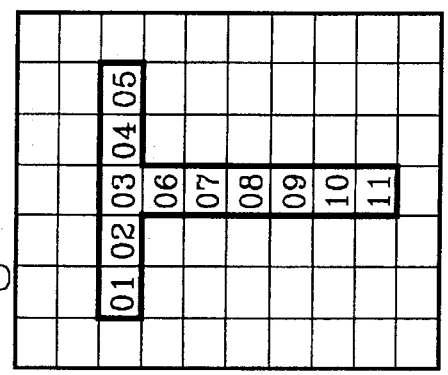
Fig 3C
Fig 3A
Fig 3B

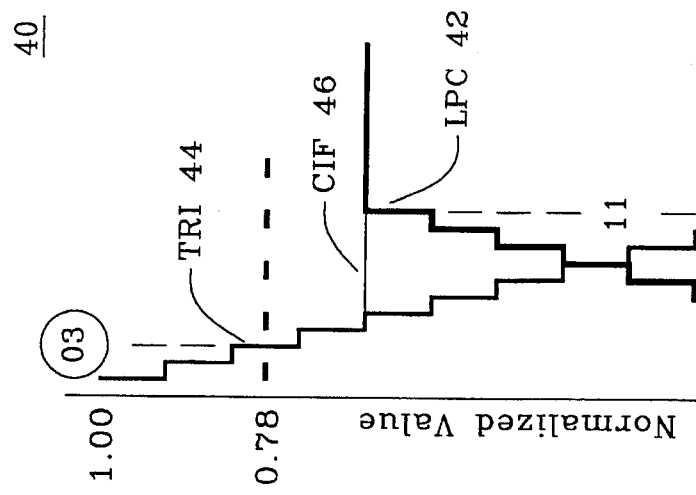
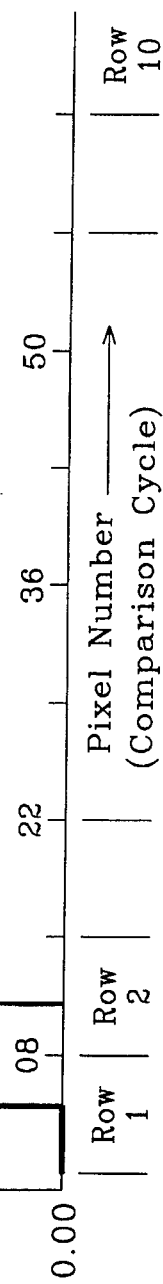
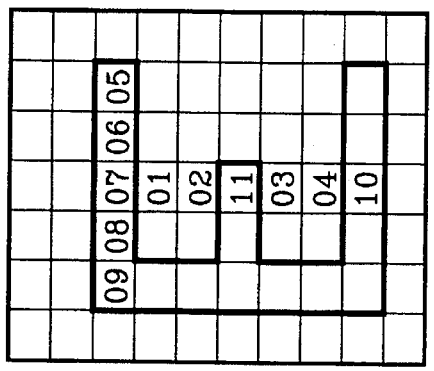
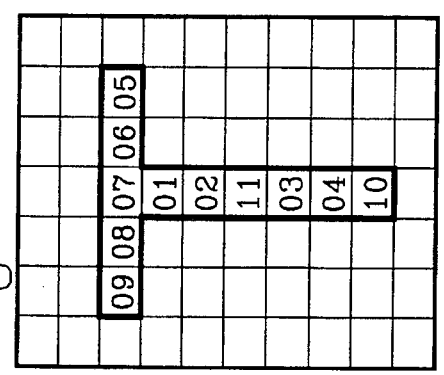

COMPARISON INEQUALITY FUNCTION BASED METHOD FOR ACCELERATED OCR CORRELATION

RELATED APPLICATIONS

This is a continuation of U.S. patent application Ser. No. 08/140,310 filed on Oct. 22, 1993, now abandoned.

TECHNICAL FIELD

This invention relates to the OCR classification of input symbols, and more particularly to a method based on comparison inequality function which employs an exclusion threshold for accelerating the correlation calculations.

BACKGROUND

Heretofore, comparison functions have been employed to classify input symbol bit maps against a library of character template bit maps. The summation of all of the pixel comparisons in each of the input/template correlations produced correlation values which revealed the closest match. However, these prior correlation techniques did not employ a comparison inequality function and underlying "Exclusion Inequality Principle" for excluding low correlation templates in order to accelerate the classification process. Nor did these prior art techniques employ pixel intensity sorting and pixel discrimination sorting.

U.S. Pat. No. 5,379,349, issued Jan. 3, 1995 to Hadar Avi-Itzhak (Ser. No. 07/937,732, filed Sep. 1, 1992 by the present assignee) entitled METHOD OF OCR TEMPLATE ENHANCEMENT BY PIXEL WEIGHTING, teaches the use of a comparison function to enhance a library of character templates with respect to a particular font or variation range of the input symbols.

Ser. No. 08/008,556, filed Jan. 22, 1993, now abandoned by the present assignee entitled METHOD OF MULTI-FONT TEMPLATE ENHANCEMENT, teaches enhancement of library character templates with a provision for template sub-classes to accommodate multiple representations of each input symbol.

Ser. No. 08/062,830, filed May 17, 1993, now abandoned by the present assignee entitled A COMPARISON FUNCTION BASED METHOD OF ACCELERATED NEAREST NEIGHBOR OCR CLASSIFICATION, teaches the use of the "Triangle of Inequality Principle" in order to exclude distant templates and accelerate the classification process.

SUMMARY

It is therefore an object of this invention to provide a comparison inequality function (CIF) based method for accelerated OCR vector classification.

It is therefore an object of this invention to provide such a CIF based method with accelerated correlation calculations for classifying an unclassified input symbol into a library of pre-classified character templates.

It is another object of this invention to provide such a comparison function based method which the correlation calculation is accelerated by employing an "Exclusion Inequality Principle".

It is another object of this invention to provide such a CIF based method which is accelerated by employing exclusion thresholds.

It is another object of this invention to provide such a CIF based method which employs exclusion check points.

It is another object of this invention to provide such a CIF based method which is accelerated by intensity sorting.

It is another object of this invention to provide such a CIF based method which is accelerated by discrimination power sorting.

It is a further object of this invention to provide such a CIF based method in which template data is pre-calculated and stored for immediate use in the correlation calculations.

Briefly, these and other objects of the present invention are accomplished by providing a method of accelerating the classification of an unclassified input symbol S into a library of pre-classified templates. A correlation calculation is initiated between the input symbol S and templates retrieved from the library of templates. Templates with a low degree of correlation are excluded prior to completion of the correlation calculation. An input symbol S is provided in the form of an input vector defining an unclassified character having "q" elements ($S = s_1, s_2, s_3, \ldots s_k \ldots s_j \ldots s_q$). A library of T templates ($T_1, T_2, T_3, \ldots T_i \ldots T_T$) are provided which are retrieved for correlation with the input vector. Each template is in the form of a template vector defining a pre-classified character having "q" elements ($T_i = t_1, t_2, t_3, \ldots t_k \ldots t_j \ldots t_q$) forming "q" pairs of corresponding elements with the "q" elements of the input vector. A comparison inequality function is provided for correlating the input vector with the template vectors, which defines an element by element correlation calculation $(s, t_i)$. The comparison inequality function executes an element calculation cycle for each of the "q" pairs of corresponding elements of the input vector and each retrieved template vector to yield an element term for each pair of corresponding elements. The comparison inequality function sums the element terms from previous calculation cycles of the correlation calculation $(s, t_i)$ to yield a cumulative bound after "k" calculation cycles and to yield a final bound after the completion of "q" calculation cycles. An exclusion threshold is determined for excluding the retrieved template if the cumulative bound crosses the exclusion threshold and non-excluding the retrieved template if the cumulative bound does not cross the exclusion threshold. An initial template is retrieved from the library of templates. The element by element correlation calculation $(s, t_i)$ is initiated for the "q" pairs of corresponding elements to yield the cumulative bound. The retrieved template is excluded if the cumulative bound crosses the exclusion threshold. The correlation calculation and excluding steps are repeated until the retrieved template has been excluded or until the correlation calculation $(s, t_i)$ for the retrieved template has proceeded to completion to yield the final bound. Non-excluded retrieved templates are saved. A next template is retrieved from the library of templates. The correlation calculation and excluding and saving and retrieving steps are repeated until all of the template vectors have been correlated with the input vector. The unclassified input symbol is classified against the non-excluded pre-classified templates on the basis of the numerical values of the final bound yielded by the correlation calculations.

BRIEF DESCRIPTION OF THE DRAWING

Further objects and advantages of the present invention comparison inequality function (CIF) based method and the acceleration of the correlation calculations will become apparent from the following detailed description and drawing (not drawn to scale) in which:

FIGS. 3A and 3B and 3C are similar in format to FIGS. 1A and 1B and 1C, and illustrate an intensity sorted embodiment for reducing the calculation cycles required to complete the E/T correlation calculation;

FIGS. 4A and 4B and 4C are also similar in format to FIGS. 1A and 1B and 1C, and illustrate a double sorted embodiment;

Figure 1:
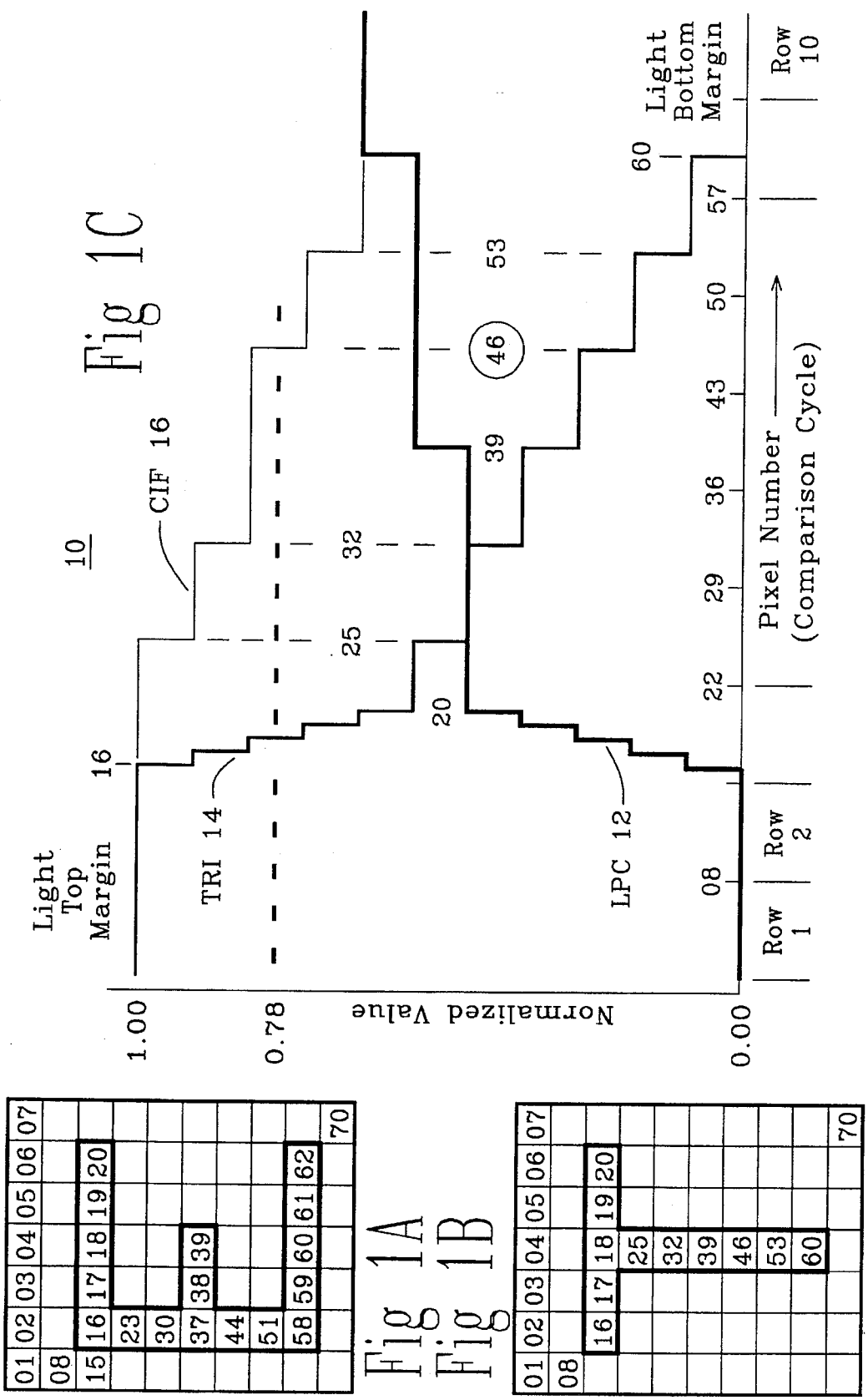
FIG. 1A shows a binary low resolution bit map diagram of an input symbol "E"
FIG. 1B shows a binary low resolution bit map diagram of a template character "T"
FIG. 1C is an element by element plot of the input "E" bit map correlated with the template "T" bit map showing the LPC sum and the TRI sum and the CIF.

The first digit of each reference numeral in the above figures indicates the figure in which that element is most prominently shown. The second digit indicates related structural elements, and the final letter indicates a sub-portion of an element.

EXCLUSION INEQUALITY PRINCIPLE

The accelerated classification of an unclassified input symbol into a library of pre-classified character templates, is based on an inequality principle developed from a suitable Comparison Function (CF) such as an equality Cauchy-Schwartz function. The Comparison Function provides an element by element correlation in which each element of the input symbol vector is combined with the corresponding element of the template vector to yield a correlation coefficient. The Cauchy-Schwartz Equality Correlation Function (Symbol, ith Template) format for correlating an unclassified input symbol vector $$(S = s_1, s_2, s_3, \ldots s_k \ldots s_j \ldots s_q)$$

and the ith pre-classified template vector $$(T_i = t_1, t_2, t_3, \ldots t_k \ldots t_j \ldots t_q) \text{ is:}$$

$$CF(S,T_i) = \text{(dot product sum)/(image intensity sum)} \quad \text{(Eq-1)}$$

$$CF(S,T_i) = \frac{\sum_{j=1}^{q} s_j t_j}{\sqrt{\sum_{j=1}^{q} s_j^2 \sum_{j=1}^{q} t_j^2}}$$

The input vector is equivalent to the memory bit map of the input symbol, with each individual element representing the image intensity (the binary or greyscale contrast level) of an individual pixel within the bit map. Similarly, the elements of the template vector represent pixels in the character template bit map.

The dot product sum (numerator of Equation 1) is the summation of all the individual $(S,T_i)$ element calculations for corresponding pairs of elements from the first element pair $(s_1, t_1)$ to the last element pair $(s_q, t_q)$. In the Cauchy-Schwartz case this element calculation is a simple multiplication. The image intensity sum (denominator of Equation 1) in the Cauchy-Schwartz case involves the square of each $s_j$ and $t_j$ element. The unclassified input character S is classified as the template character having the highest correlation therewith.

Without loss of generality, the input vector and the template vectors may be prescaled (normalized) to unit norm. In which case Equation 1 becomes:

Normalized C–S Correlation Function = (Eq-2)

$$CF(S,T_i \text{ norm}) = \sum_{j=1}^{q} s_j t_j$$

The image intensity sum in the denominator of Equation 2 has been normalized to unity. The dot product sum in the numerator remains unchanged, except that the "s" and "t" elements now refer to a normalized "s" and "t" values.

The input vector and the template vectors may be separated into a Leading Partial Vector (LPV) and a Tailing Partial Vector (TPV) by the kth element calculation:

| Input Symbol Vector | = | $[LPVs, TPVs]$ |
| S | = | $[(s_1, s_2 \ldots s_k),(s_{k+1} \ldots s_q)]$ |
| Template Symbol Vector | = | $[LPVt, TPVt]$ |
| $T_i$ | = | $[(t_1, t_2 \ldots t_k),(t_{k+1} \ldots t_q)]$ | for any k between 1 and q. The Comparison Function is similarly separated into a Leading Partial Correlation (LPC) and a Tailing Partial Correlation (TPC) by the kth term as the correlation calculation proceeds:

$$CF(S,T_i) = LPC + TPC \quad \text{(Eq-3)}$$

$$CF(S,T_i) = \sum_{j=1}^{k} s_j t_j + \sum_{j=k+1}^{q} s_j t_j$$

The leading partial correlation (LPC) of the first k elements is cumulative. That is, the LPC sum is updated after each element calculation cycle by summation of the current element calculation with the prior (k−1) LPC sum. The TPC containing the remaining k+1 elements is never calculated. Instead the TPC is replaced by a Residual Intensity sum (see equations 4, 5, and 6).

The equality Comparison Function (CF) of Equation 3 becomes the Cauchy-Schwartz Comparison Inequality Function (CIF) of Equation 4 by replacing the TPC with a compound residual intensity sum formed by a Symbol Residual Intensity sum and a Template Residual Intensity sum. The Symbol Residual Intensity (SRI) sum is the image intensity data (or input symbol information) remaining in the TPC after the kth calculation cycle. The Template Residual Intensity (TRI) sum is the image intensity data (or template character information) remaining in the TPC after the kth calculation cycle.

$$CIF(S,T_i) \leq LPC + (SRI)(TRI) \quad \text{(Eq-4)}$$

$$CIF(S,T_i) \leq \sum_{j=1}^{k} s_j t_j + \sqrt{\sum_{j=k+1}^{q} s_j^2} \sqrt{\sum_{j=k+1}^{q} t_j^2}$$

The compound residual intensity sum represents the maximum possible value of the TPC which theoretically would occur if all of the remaining k+1 elements of the input vector were to correlate perfectly with the remaining k+1 elements of the template vector.

Because the Equation 4 inequality is based on the normalized Equation 2 equality, the residual sums SRI and TRI are necessarily less than unity. As the correlation calculation proceeds, LPC increases at a faster rate than (SRI) (TRI) decreases. Both the SRI sum and the TRI sum approach zero as "k" approaches "q", causing the inequality bound to become "tighter". At "k" equal "q", LPC becomes the complete correlation. The uncertainty introduced by the residual sums is self-removing. The Equation 4 inequality becomes an equality.

The Comparison Inequality Function (CIF) of Equation 4 becomes a simpler SRI Comparison Inequality Function (CIF) by setting the TRI sum to unity:

$$CIF(S,T_i) \leq LPC + SRI \qquad \text{(Eq-5)}$$

$$CIF(S,T_i) \leq \sum_{j=1}^{k} s_j t_j + \sqrt{\sum_{j=k+1}^{q} s_j^2}$$

The SRI inequality of Equation 5 has more uncertainty than the (SRI) (TRI) inequality of Equation 4 At "k=q", LPC becomes the complete correlation and the SRI sum becomes zero. The Equation 5 inequality becomes an equality.

The Comparison Inequality Function (CIF) of Equation 4 may also become a simpler TRI Comparison Inequality Function (CIF) by setting the SRI sum to unity:

$$CIF(S,T_i) \leq LPC + TRI \qquad \text{(Eq-6)}$$

$$CIF(S,T_i) \leq \sum_{j=1}^{k} s_j t_j + \sqrt{\sum_{j=k+1}^{q} t_j^2}$$

The TRI inequality of Equation 6 also has more uncertainty than the (SRI) (TRI) inequality of Equation 4. At "k" equal "q", the TRI sum becomes zero, and the Equation 6 inequality becomes an equality.

BINARY EMBODIMENT—UNSORTED (FIGS. 1A, 1B, 1C)

The element by element correlation of input symbol "E" (see pixel bit map, FIG. 1A) and template character "T" (see pixel bit map, FIG. 1B) may be illustrated by a correlation graph 10 (see FIG. 1C). Leading partial correlation sum LPC 12 (bold plot) of the TRI inequality (Eq-6) is cumulative and increases stepwise monotonically as the E/T correlation calculation (s,t$_i$) proceeds to completion. TRI sum 14 (medium plot) decreases stepwise monotonically, and comparison inequality function CIF 16 (light plot) decreases at a slower rate. CIF 16 defines an upper cumulative bound which becomes the final bound (CIF=LPC) as TRI 14 becomes zero.

In order to minimize the number of elements and calculation cycles in the FIG. 1 example, a simple binary, low resolution (10 rows by 7 columns) pixel matrix of symbol "E" and template "T" is presented. The inequality exclusion principle is applicable to higher resolution binary (and greyscale) embodiments which of course are more complex and require a great deal more data and computer memory. The corresponding pixel pairs of symbol "E" and template "T" are indicated by numbers 01 through 70 in the bit maps of FIGS. 1A and 1B. Only the numbers of landmark pixels have been included in the bit maps (and in the plots of correlation graph 10). Most landmark pixels indicate an intensity transition between background pixels (typically light or white) and foreground pixels (typically dark or black). Background pixels usually form the majority of the pixel population, and foreground pixels usually form the minority. Foreground pixels form the strokes of the input symbol and templates, as shown by the bold outline of "E" in FIG. 1A and "T" in FIG. 1B.

In the FIG. 1 low resolution embodiment, the pixels are considered in the ordinary raster scan order from the first pixel (number 01, upper lefthand corner) to the last pixel (number 70, lower righthand corner); and are sequentially accessed from the bit map memory. The effect of sorting the pixels based on binary light/dark (or on greyscale intensity) is discussed in the GREYSCALE EMBODIMENTS section. Double sorting is discussed in the DOUBLE TEMPLATE SORT section.

The horizontal axis of FIG. 1C is equivalent to time and increments to the right after the each calculation cycle (kth) to the next corresponding pixel pair (k+1), until completion (k=q=70). The correlation calculation (s, t$_1$) is effectively complete at k=60 when TRI=0 and LPC=CIF. The remaining pixels 61 through 70 are background pixels and do not contain useful data for the Cauchy-Schwartz TRI inequality embodiment (Eq-6). The vertical axis of FIG. 1C shows the value of LPC 12 and TRI 14 and CIF 16 normalized between 0.00 and 1.00. TRI 14 starts at 1.00 (k=0) and remains zero through the top margin (Rows 1 and 2) until pixel number 16 when template "T" changes from light background to dark foreground. LPC 12 starts at zero (k=0) until pixel number 16 when both template "T" and symbol "E" change from light background to dark foreground. The binary embodiment given above presents four classes of conflict situations (shown in the Binary Conflict Table below) between input pixels (light or dark) and template pixels (light or dark).

| BINARY CONFLICT TABLE | |
|---|---|
| CLASS A | (Absent Conflict) Input Light - Template Light (includes the light margin region around the perimeter of the bit map, Rows 1, 2, and 10, Columns 1 and 7, and some interior pixels). LPC 12 does not change at Class an absent conflict pixels because "s" and "t" are zero. TRI 14 does not change because "t" is zero. CIF 16 does not change because neither LPC 12 nor TRI 14 changes. |
| CLASS B | (Overt Conflict) Input Light - Template Dark (Includes pixels 25, 32, 46, and 53). LPC 12 does not change at Class B overt conflict pixels because "s" is zero. TRI 14 decreases because "t" is non-zero. CIF 16 decreases because only TRI 14 changes. |
| CLASS C | (Covert (Conflict) Input Dark - Template Light (includes pixels 23, 30, 37, 38, 44, 51, 58, 59, 61, and 62). LPC 12 does not change at Class C covert conflict pixels because "t" is zero. TRI 14 does not change because "t" is zero. CIF 16 does not change neither LPC 12 nor TRI 14 changes. |
| CLASS D | (Absent Conflict) Input Dark - Template Dark (includes pixels 16, 17, 18, 19, 20, 39, and 60). LPC 12 increases because both "s" and "t" are non-zero. TRI 14 decreases because "t" is non-zero. CIF 16 does not change because LPC 12 and TRI 14 make offsetting changes. |

TRI 14 step decreases eleven times during the correlation calculation, when "t" is non-zero (Classes B and D). LPC 12 step increases only seven times, when both "s" and "t" are non-zero (Class D). CIF 16 decrease four times (Class B). TRI 14 is a "t" square summation and is not affected by the zero status of "s". While LPC 12 is an "s" times "t" product summation and is zero when either "s" or "t" is zero.

The size of the step changes in LPC 12 and TRI 14 and CIF 16 are not drawn to scale in FIG. 1C. The step sizes are presented as equal and constant for simplicity of illustration. The step sizes are actually a function of the intensity information (the number of foreground pixels) in the bit maps. The normalized step size of the LPC 12 plot is one over the square root of the number of foreground pixels in the "E" input symbol bit map, and is constant throughout the correlation calculations. The normalized step size of the TRI 14 plot is one over the square root of the ratio of foreground pixels remaining in the TRI sum (at k=j) to the foreground pixels in the "T" template bit map (at k=0). The TRI step progressively decreases as the correlation calculation proceeds to completion. The step size of the CIF plot tracks the varying difference in the LPC and TRI step sizes.

GENERAL METHOD—FLOW CHART (FIG. 2)

Figure 2:
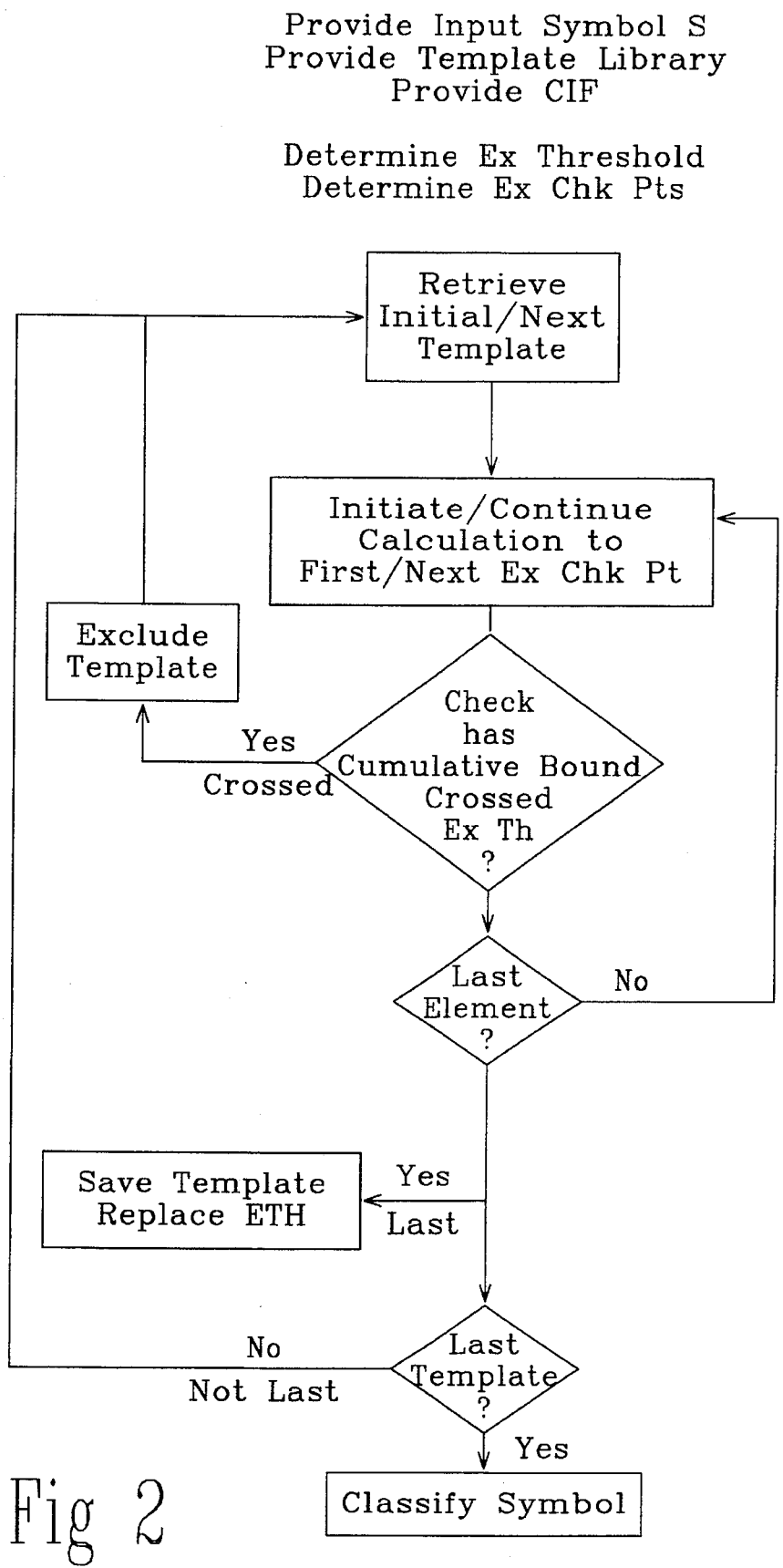
FIG. 2 is a flow chart of the basic steps of the accelerated CIF based method.

A general method of accelerating the classification of an unclassified input symbol S into a library of pre-classified templates is shown in FIG. 2. The correlation calculation $(s,t_i)$ is initiated between the input symbol S and templates retrieved from the library of templates. Templates with a low degree of correlation are excluded prior to completion of the correlation calculation in order to accelerate the correlation. The basic steps of the OCR method are shown in FIG. 2 and described below.

Providing an input symbol S in the form of an input vector defining an unclassified character having "q" elements $(S=s_1, s_2, s_3, \ldots s_k \ldots s_j \ldots s_q)$.

Providing a library of T templates $(T_1, T_2, T_3, \ldots T_i \ldots T_T)$ which are retrieved for correlation with the input vector. Each template is in the form of a template vector defining a pre-classified character having "q" elements $(T_i = t_1, t_2, t_3, \ldots t_k \ldots t_j \ldots t_q)$ forming "q" pairs of corresponding elements with the "q" elements of the input vector.

Providing a comparison inequality function for correlating the input vector with the template vectors which defines an element by element correlation calculation $(s,t_i)$ and executes an element calculation cycle for each of the "q" pairs of corresponding elements. The correlation calculation $(s,t_i)$ yields an element term for each pair of corresponding elements. The correlation calculation $(s,t_i)$ also sums the element terms from previous calculation cycles of the correlation calculation $(s,t_i)$ to yield a cumulative bound after "k" calculation cycles and to yield a final bound after the completion of "q" calculation cycles.

Determining an Exclusion Threshold for excluding the retrieved template if the cumulative bound crosses the exclusion threshold, and not excluding the retrieved template if the cumulative bound does not cross the exclusion threshold (see EXCLUSION THRESHOLDS section). An exclusion threshold (ETH) of 0.78 is shown in the unsorted embodiment (FIG. 1) and the intensity sorted embodiment (FIG. 3) and the double sorted embodiment (FIG. 4) for comparison of the calculation cycles required to complete the correlation.

Determining a series of sequential Exclusion Check Points with intervals of element calculation cycles therebetween for comparing the cumulative bound to the exclusion threshold as the correlation calculation $(s,t_i)$ proceeds (see EXCLUSION CHECK POINTS section).

Retrieving an initial template from the library of templates. The template vector may be obtained from the library in memory order, or in random order, or selected based on historical inference or other selection criteria.

Initiating the Element by Element Correlation Calculation $(s,t_i)$ for the "q" pairs of corresponding elements to yield the cumulative bound.

Excluding the retrieved template if the cumulative bound crosses the exclusion threshold. An entire correlation calculation need not be completed for the excluded templates.

Repeating the Correlation Calculation and excluding steps until the retrieved template has been excluded or until the correlation calculation $(s,t_i)$ for the retrieved template has proceeded to completion to yield the final bound.

Saving non-excluded retrieved templates.

Retrieving a next template from the library of templates.

Repeating the correlation calculation and excluding and saving and retrieving steps until all of the template vectors have been correlated with the input vector.

Classifying the unclassified input symbol against the non-excluded pre-classified templates on the basis of the numerical values of the final bound yielded by the correlation calculations.

EXCLUSION THRESHOLDS

Exclusion thresholds (ETH) may be employed for excluding the retrieved template if the cumulative bound crosses the threshold. An ETH of 0.78 (as shown in FIGS. 1 and 3 and 4) is a suitable value for excluding low correlation templates early in the correlation calculation. If the cumulative bound does not cross the exclusion threshold, than the retrieved template is not excluded. The exclusion threshold may be cumulative and determined by replacing an initial exclusion threshold with the final bound of each non-excluded template during the classification process of the input vector with the template vectors. All of the retrieved templates are excluded during a typical classification process except for a single non-excluded template. The cumulative bound progresses toward the final bound of the single non-excluded template. The initial cumulative bound for each correlation calculation $(s,t_i)$ may be high and form an upper bound which progresses downward toward the final bound. In the upper bound embodiment of FIG. 1, the cumulative bound is initially 1.00, and decreases until the correlation calculation is complete or the cumulative bound crosses the ETH of 0.78.

The initial exclusion threshold may be zero, and build up a little (or a lot) for each non-excluded template. The correlation calculation $(s,t_i)$ for the initial template yields the first finite exclusion threshold. As the exclusion threshold increases, the decreasing cumulative bound will generally cross the exclusion threshold in fewer calculation cycles. That is, the higher the exclusion threshold the greater is the correlation acceleration. The initial exclusion threshold may be finite, in which case correlation acceleration is in effect from the initial calculation cycle. The initial exclusion threshold may be greater than zero but less than (or equal to) a minimum acceptable final bound. The greatest acceleration is provided by an exclusion threshold equal to the minimum acceptable final bound. This high exclusion threshold does not require a build-up time as does the zero initial exclusion threshold; and rapidly excluded the hopeless low correlation templates from the vert first calculation cycle.

Figure 5:
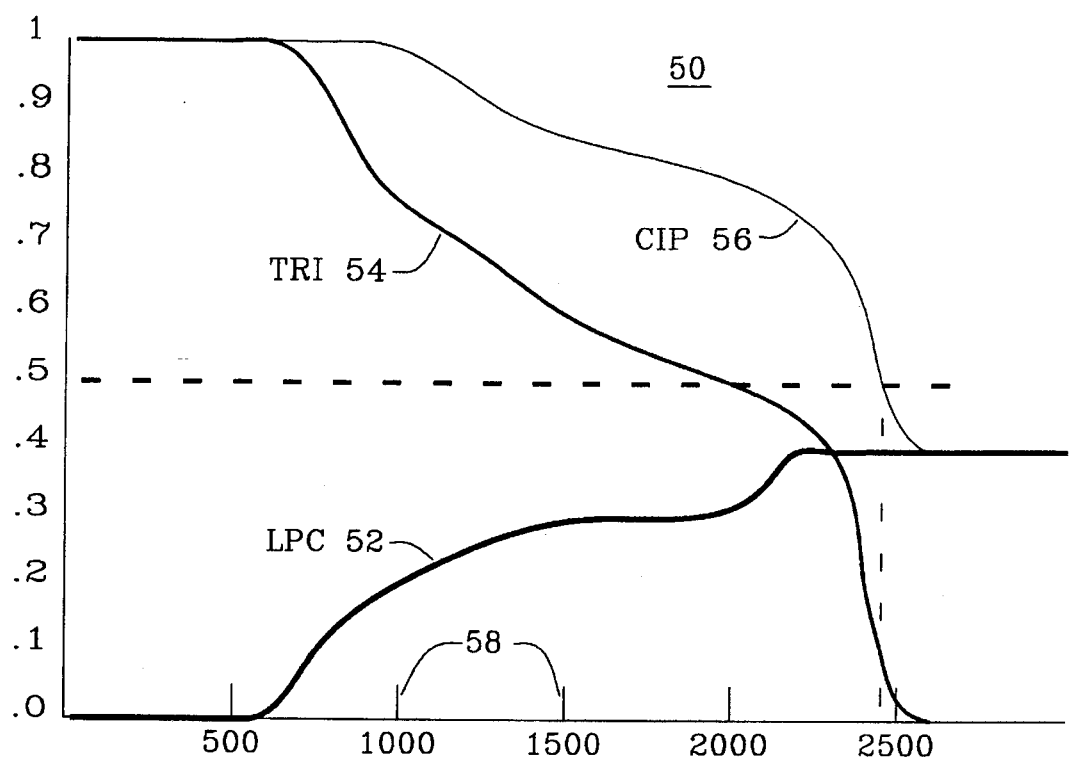
FIG. 5 is an E/T correlation graph based on high resolution greyscale bit maps without sorting showing the LPC sum and the TRI sum and the CIF total.
Figure 6:
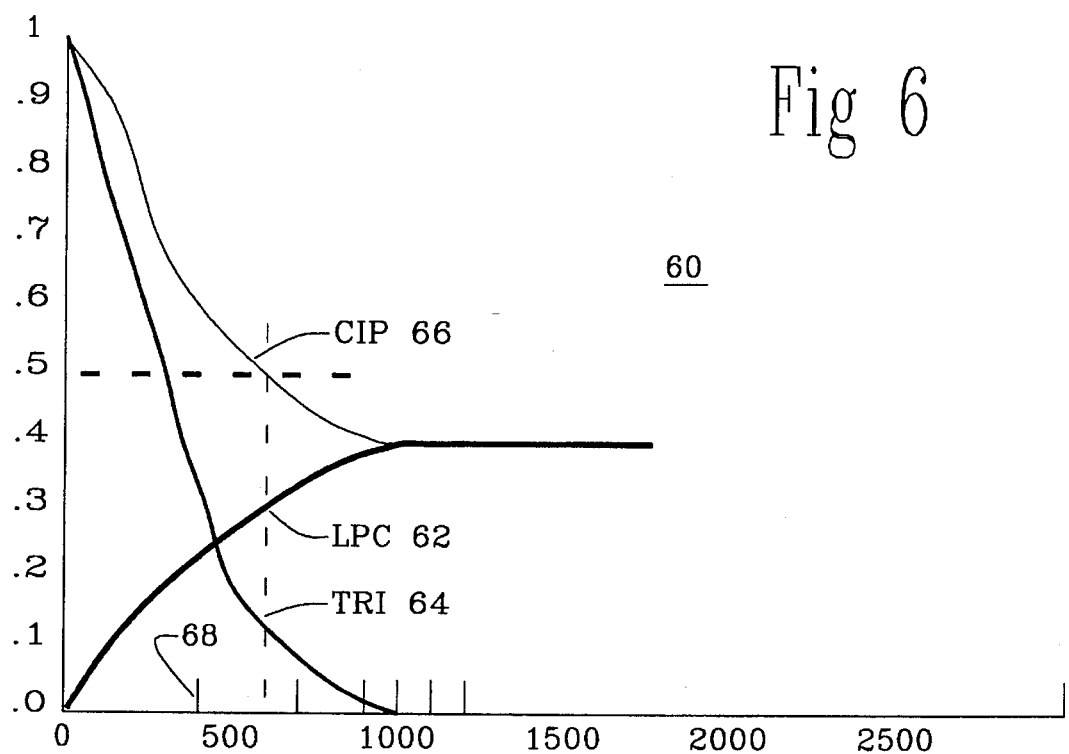
FIG. 6 is the E/T correlation graph of FIG. 5 with intensity sorting for accelerating the correlation calculations.

EXCLUSION CHECK POINTS (FIGS. 5 and 6)

Exclusion check points 58 may be provided at intervals during each correlation calculation (see FIG. 5) for comparing the decreasing cumulative bound with the exclusion threshold to determine whether the cumulative bound has crossed the exclusion threshold. If the exclusion threshold has been crossed the correlation calculation for that template vector is terminated, and the next template vector is retrieved. The excluding step (see FIG. 2) may include the additional steps described below.

Checking for exclusion of the retrieved template at the first exclusion check point by comparing the cumulative bound with the exclusion threshold.

Excluding the retrieved template by terminating the element by element correlation calculation $(s,t_i)$ if the cumulative bound has crossed the exclusion threshold.

Continuing the Element by Element Correlation Calculation $(s,t_i)$ to next the exclusion check point if the cumulative bound has not crossed the exclusion threshold.

The number of element calculation cycles within each interval of calculation cycles between the exclusion check points may be fixed providing a linear series of exclusion check points equally spaced along the horizontal axis of the correlation plot (as shown in FIG. 5). Short intervals with a few calculation cycles involve frequent checking, and minimizes overshoot of the cumulative bound beyond the exclusion threshold. The fixed number of calculation cycles in each interval may be one, in which case the checking step occurs after every calculation cycle, and overshoot is prevented. If the bit map matrix is large (high resolution), checking the present cumulative bound may require less computer time than calculating the next cumulative bound.

The number of calculation cycles in each interval may be variable, or adaptive as the element by element correlation calculation $(s,t_i)$ proceeds providing a non-linear series of exclusion check points. In one adaptive embodiment, the number of calculation cycles in each interval between exclusion check points 68 (see FIG. 6) may become smaller as the element by element correlation calculation $(s,t_i)$ proceeds. The correlation calculation is checked less frequently at the start of the correlation calculation, and more frequently as the cumulative bound approaches the exclusion threshold.

The exclusion check point interval may be based on the change in the TRI sum or the cumulative bound instead of the number of calculation cycles executed in the correlation calculation. The change in the cumulative bound during each interval of element calculation cycles between the exclusion check points may be fixed providing a linear series of exclusion check points equally spaced along the vertical axis of the correlation plot. Alternatively, the change in the cumulative bound during each interval may be adaptive, and for example become progressively smaller as the LPC sum approaches the CIF sum.

TEMPLATE INTENSITY SORT (FIG. 3)

The q pairs of corresponding elements in the input vector and the template vector may be unsorted and correlated by the correlation calculation $(s,t_i)$ in sequential order of position within the input vector bit map and the template vector bit map (see FIG. 1). Alternatively, the q pairs of corresponding elements may be sorted and correlated in the order of the sort to accelerate the correlation calculation see FIG. 3). The vector elements have numerical values indicating intensity, and the pixels in the bit map may be sorted by numerical value prior to the correlation calculation to determine the correlation order. The sort may be by background pixels (majority population) or by foreground pixels (minority population) in either the input vector or the template vector. The numerical sort may be in forward numerical order (lowest intensity first) or in reverse order (highest intensity first). Binary bit maps require a simple two level sort. Greyscale bit maps may be sorted by all (or some) intensity levels, or digitized to binary for sorting.

FIG. 3C illustrates the E/T correlation plot 30 of a low resolution binary template which has been foreground sorted. The strokes of template "T" contain eleven foreground pixels which form the first eleven elements of the correlation calculation (see FIG. 3B). TRI 34 decreases each calculation cycle until TRI=0 (at k=11) at which time leading partial correlation LPC 32 is equal to comparison inequality function CIF 36 and the correlation calculation is complete. For an exclusion threshold (ETH) of 0.78, the template vector is excluded at the ninth calculation cycle as shown in FIG. 3C. The E/T unsorted correlation of FIG. 1 required 46 calculation cycles before CIF 16 crossed the ETH at 0.78.

Sorting by template foreground pixels as shown in FIG. 3 has several advantages. A bit map normally has fewer foreground pixels than background pixels, and therefore fewer calculation cycles required for completion. Only the stroke pixels (dark) must be sorted and correlated. The large area forming the peripheral background margins (white) are not applicable to foreground sorting and may be disregarded. Also the intensity sort order of each template may be pre-determined and stored in memory for retrieval with the template bit map.

DOUBLE TEMPLATE SORT (FIG. 4)

The q pairs of corresponding elements in the input vector and the template vector may be double sorted, first by intensity and then by discrimination power (see FIG. 4). Each pixel in a character bit map has a certain probability of being in overt conflict (see conflict table—Class B) with the corresponding pixel in another bit map. The pixels within the central background area of the bit map that are less likely to contain a stroke pixel have the highest discrimination power, and are correlated first in the double sort embodiment.

FIG. 4C illustrates the E/T correlation plot 40 of a low resolution binary template in which foreground pixels have been double sorted. The template "T" contains eleven pixels which form the first eleven elements of the correlation calculation (see FIG. 4B), as determined by the first sort (the same intensity sort as shown in FIG. 3). As in the single intensity sort, TRI 44 decreases each calculation cycle until TRI=0 (at k=11) at which time LPC 42 is equal to comparison inequality function CIF 46 and the correlation calculation is complete. However, CIF 46 and leading partial correlation LPC 42 behave differently in the double sort embodiment. CIF 46 decreases at each of the first four calculation cycles, and LPC 42 has remained at 0.00.

Pixels 01, 02, 03, and 04 of the "T" template are off the common stroke paths. Most characters including input symbol "E" do not have a central vertical stroke forming a column of background pixels in the center of the bit map. Further, the heights of these four template pixels are slightly displaced from the heights of most horizontal strokes. Of all of the pixels in the "T" template, these four are the most likely to be in overt conflict (Class B) with the pixels of an input symbol presented at random.

For an ETH of 0.78, the template vector is excluded at the third calculation cycle as shown in FIG. 4C. The E/T single sorted correlation of FIG. 3 required nine calculation cycles before CIF 36 crossed the ETH at 0.78. The unsorted correlation of FIG. 1 required 46 calculation cycles.

GREYSCALE EMBODIMENTS (FIGS. 5 and 6)

The exclusion threshold, intensity sorting, and double sorting acceleration techniques are also applicable to high resolution greyscale bit maps. FIG. 5 shows E/T correlation graph 50 based on high resolution bit maps (60 rows by 50 columns) with greyscale (256 levels). The three plots LPC 52 and TRI 54 and CIP 56 are flat during the intial correlation calculations due to the low intensity top margins of the "E" and "T" bit maps. TRI 54 descends to zero and the correlation calculation is complete at about q=2600. The last 400 pixels or so are template bottom margin. However for an ETH=0.50, the "T" template is excluded at about q=2450.

FIG. 6 shows E/T correlation graph 60 with the same bit map base as graph 50 but with intensity sorting for accelerating the correlation calculations. The three plots LPC 62 and TRI 64 and CIP 66 progress at a faster rate. TRI 54 descends to zero and the correlation calculation is complete at about q=1000. However for an ETH=0.50, the "T" template is excluded at about q=600.

INDUSTRIAL APPLICABILITY

It will be apparent to those skilled in the art that the objects of this invention have been achieved by providing a comparison inequality function (CIF) based method for accelerated OCR vector classification. Accelerated correlation calculations are employed for classifying an unclassified input symbol into a library of pre-classified character templates. The correlation calculation may be accelerated by employing an "Exclusion Inequality Principle". Inaddition exclusion thresholds and/or exclusion check points may be employed. Further acceleration may be provided by intensity sorting, and double sorting based on discrimination power of key elements.

Clearly various changes may be made in the structure and embodiments shown herein without departing from the concept of the invention. Further, features of the embodiments shown in the various figures xmay be employed with the embodiments of the other figures.

Therefore, the scope of the invention is to be determined by the terminology of the following claims and the legal equivalents thereof.

I claim as my invention:

1. A computer-implemented method of accelerating the classification of an unclassified input symbol S into a library of pre-classified templates, said method comprising the steps of:

a) providing as an input to a processing unit of a computer an input symbol S in the form of an input vector defining an unclassified character having q elements $(S=s_1, s_2, s_3, \ldots s_k \ldots s_j \ldots s_q)$;

b) storing within a first storage device associated with said commuter a library of T templates $(T_1, T_2, T_3, \ldots T_i \ldots T_T)$ to be retrieved by the processing unit for correlation with the input vector, each template in the form of a template vector defining a pre-classified character having q elements $(T_i=t_1, t_2, t_3, \ldots t_k \ldots t_j \ldots t_q)$ forming q pairs of corresponding elements with the q elements of the input vector;

c) storing within a second storage device associated with said commuter a comparison inequality function for correlating the input vector with the template vectors, which function defines an element by element correlation calculation $(s,t_i)$, executes an element calculation cycle for each of the q pairs of corresponding elements of the input vector and each retrieved template vector to yield an element term for each pair of corresponding elements, and sums the element terms from previous calculation cycles of the correlation calculation $(s,t_i)$ to yield a cumulative bound after k calculation cycles and a final bound after the completion of q calculation cycles;

d) determining an exclusion threshold for excluding the retrieved template if the cumulative bound crosses the exclusion threshold and non-excluding the retrieved template if the cumulative bound does not cross the exclusion threshold;

e) causing the processing unit to retrieve an initial template from the library of templates;

f) causing the processing unit to initiate the element by element correlation calculation $(s,t_i)$ for the q pairs of corresponding elements from the input symbol and the retrieval template to yield a cumulative bound;

g) excluding the retrieved templates if the cumulative bound crosses the exclusion threshold;

h) repeating steps f) and g) until the retrieved template has been excluded or until the correlation calculation $(s,t_i)$ for the retrieved template has proceeded to completion to yield a final bound;

i) saving the retrieved template if non-excluded;

j) causing the processing unit to retrieve a next template from the library of templates;

k) repeating steps f) through j) until all of the template vectors have been correlated with the input vector; and l) classifying the unclassified input symbol against the non-excluded pre-classified templates on the basis of the values of the final bound yielded by the correlation calculations.

2. The method of claim 1, wherein the exclusion threshold is cumulative and is determined by replacing an initial exclusion threshold with the final bound of each non-excluded template during the classification process of the input vector with the template vectors.

3. The method of claim 2, wherein all of the retrieved templates are excluded during the classification process except for a single non-excluded template.

4. The method of claim 3, wherein the cumulative bound progresses montonically toward the final bound of the single non-excluded template.

5. The method of claim 3, wherein the initial cumulative bound for each correlation calculation $(s,t_i)$ is high and forms an upper bound which progresses downward toward the final bound.

6. The method of claim 2, wherein the initial exclusion threshold is zero.

7. The method of claim 6, wherein the correlation calculation $(s,t_i)$ for the initial template yields the first finite exclusion threshold.

8. The method of claim 2, wherein the initial exclusion threshold is finite.

9. The method of claim 2, wherein the initial exclusion threshold is greater than zero but less than a minimum acceptable final bound.

10. The method of claim 1, wherein the comparison inequality function comprises a Leading Partial Correlation sum which increases monotonically and a Residual Intensity sum which decreases monotonically, the Residual Intensity sum representing the image intensity data remaining in the comparison inequality function after the kth calculation cycle.

11. The method of claim 10, wherein the correlation calculation $(s,t_i)$ is complete when the Residual Intensity sum decreases to zero.

12. The method of claim 1, wherein the comparison inequality function comprises the relationship:

$$CIF(S,T_i) \leq LPC + (SRI)(TRI)$$

where

CIF is the comparison inequality function,

LPC is a Leading Partial Correlation sum,

SRI is a Symbol Residual Intensity sum representing the symbol image intensity data remaining in the CIF as the correlation calculation proceeds, and TRI is a Template Residual Intensity sum representing the template image intensity data remaining in the CIF as the correlation calculation proceeds.

13. The method of claim 12, wherein the comparison inequality function is the relationship:

$$CIF(S,T_i) \leq \sum_{j=1}^{k} s_j t_j + \sqrt{\sum_{j=k+1}^{q} s_j^2} \sqrt{\sum_{j=k+1}^{q} t_j^2}.$$

14. The method of claim 1, wherein the comparison inequality function comprises the relationship:

$$CIF(S,T_i) \leq LPC + SRI$$

where

CIF is the comparison inequality function,

LPC is a Leading Partial Correlation sum, and

SRI is a Symbol Residual Intensity sum representing the symbol image intensity data remaining in the CIF as the correlation calculation proceeds.

15. The method of claim 14, wherein the comparison inequality function is the relationship:

$$CIF(S,T_i) \leq \sum_{j=1}^{k} s_j t_j + \sqrt{\sum_{j=k+1}^{q} s_j^2}.$$

16. The method of claim 1, wherein the comparison inequality function comprises the relationship:

$$CIF(S,T_i) \leq LPC + TRI$$

where

CIF is the comparison inequality function,

LPC is a Leading Partial Correlation sum, and

TRI is a Template Residual Intensity sum representing the template image intensity data remaining in the CIF as the correlation calculation proceeds.

17. The method of claim 16, wherein the comparison inequality function is the relationship:

$$CIF(S,T_i) \leq \sum_{j=1}^{k} s_j t_j + \sqrt{\sum_{j=k+1}^{q} t_j^2}.$$

18. The method of claim 16, wherein the value of the LPC sum is determined by the correlation calculation $(s,t_i)$ each calculation cycle, and the value of the TRI sum is pre-calculated based on the template vectors in the template library and is retrieved from the library.

19. The method of claim 1, further comprising before the initiating the element by element correlation calculation $(s,t_i)$ step, the additional step of:

determining a series of sequential exclusion check points with intervals of element calculation cycles therebetween for comparing the cumulative bound to the exclusion threshold as the correlation calculation $(s,t_i)$ proceeds.

20. The method of claim 19, wherein the excluding step comprises the substeps of:

checking for exclusion of the retrieved template at the first exclusion check point by comparing the cumulative bound with the exclusion threshold;

excluding the retrieved template by terminating the element by element correlation calculation $(s,t_i)$ if the cumulative bound has crossed the exclusion threshold; and continuing the element by element correlation calculation $(s,t_i)$ to the next exclusion check point if the cumulative bound has not crossed the exclusion threshold.

21. The method of claim 19, wherein the number of element calculation cycles in each interval of calculation cycles between the exclusion check points is fixed.

22. The method of claim 21, wherein the fixed number of element calculation cycles in each interval of calculation cycles is one and the checking step occurs after every calculation cycle.

23. The method of claim 19, wherein the number of element calculation cycles in each interval of calculation cycles between the exclusion check points is variable.

24. The method of claim 23, wherein the number of element calculation cycles in each interval is adaptive as the element by element correlation calculation $(s,t_i)$ proceeds.

25. The method of claim 24, wherein the number of element calculation cycles in each interval of calculation cycles becomes smaller as the element by element correlation calculation $(s,t_i)$ proceeds.

26. The method of claim 19, wherein the change in the cumulative bound during each interval of element calculation cycles between the exclusion check points is fixed.

27. The method of claim 1, wherein the q pairs of corresponding elements in the input vector and the template vector are unsorted and are correlated by the correlation calculation $(s,t_i)$ in sequential order of position within the input vector and the template vector.

28. The method of claim 1, wherein the q pairs of corresponding elements in the input vector and the template vector are sorted and are correlated by the correlation calculation $(s,t_i)$ in the order of the sort.

29. The method of claim 28, wherein the vector elements in the input vector and the template vector have numerical values, and the sort is by numerical value.

30. The method of claim 29, wherein the numerical values are binary values.

31. The method of claim 29, wherein the numerical values indicate greyscale levels.

32. The method of claim 29, wherein the q pairs of corresponding elements are sorted by the numerical values of the elements forming the input vector.

33. The method of claim 29, wherein the q pairs of corresponding elements are sorted by the numerical values of the elements forming the template vector.

34. The method of claim 29, wherein elements forming the foreground of the template vectors have discrimination power, and the q pairs of corresponding elements are double sorted;

first by the numerical values of the elements forming the template vector; and second by the discrimination power of the foreground elements forming the template vector.

35. The method of claim 29, wherein the q pairs of corresponding elements are sorted by the numerical values of the elements forming the foreground.

36. The method of claim 29, wherein the q pairs of corresponding elements are sorted by the numerical values of the elements forming the background.

* * * * *